United States Patent
Kim et al.

(10) Patent No.: US 9,951,176 B2
(45) Date of Patent: Apr. 24, 2018

(54) POLYESTER FIBER AND METHOD FOR PREPARING THE SAME

(75) Inventors: Jae-Hyung Kim, Gumi-si (KR); Dong-Jin Kwak, Gumi-si (KR); Ki-Jeong Kim, Daegu (KR); Hee-Jun Kim, Daegu (KR); Jung-Hoon Youn, Gumi-si (KR); Sang-Mok Lee, Gumi-si (KR)

(73) Assignee: KOLON INDUSTRIES, INC., Kwacheon (KR)

( * ) Notice: Subject to any disclaimer, the term of this patent is extended or adjusted under 35 U.S.C. 154(b) by 1190 days.

(21) Appl. No.: 13/824,896

(22) PCT Filed: Sep. 16, 2011

(86) PCT No.: PCT/KR2011/006863
§ 371 (c)(1),
(2), (4) Date: Apr. 25, 2013

(87) PCT Pub. No.: WO2012/036509
PCT Pub. Date: Mar. 22, 2012

(65) Prior Publication Data
US 2013/0224468 A1    Aug. 29, 2013

(30) Foreign Application Priority Data

Sep. 17, 2010 (KR) .................. 10-2010-0092104

(51) Int. Cl.
*C08G 63/183* (2006.01)
*D01F 6/62* (2006.01)
(Continued)

(52) U.S. Cl.
CPC ........... *C08G 63/183* (2013.01); *D01D 5/098* (2013.01); *D01D 5/16* (2013.01); *D01D 10/02* (2013.01);
(Continued)

(58) Field of Classification Search
CPC .. D01F 6/62; D01F 6/625; D01F 6/64; D01D 10/02; D01D 5/098; D01D 5/16;
(Continued)

(56) References Cited

U.S. PATENT DOCUMENTS 3,650,879 A * 3/1972 Munting .................. D01F 6/62
                                                                                                       442/149
4,491,657 A    1/1985 Saito et al.
(Continued)

FOREIGN PATENT DOCUMENTS

EP          1845177 A2    10/2007
JP          57-154410 A    9/1982
(Continued)

OTHER PUBLICATIONS

Machine Translation of JP 2007-182646A (2007).*
(Continued)

*Primary Examiner* — Scott R Walshon
(74) *Attorney, Agent, or Firm* — Sughrue Mion, PLLC (57) ABSTRACT

A polyester fiber that can be used for an airbag fabric is disclosed. The polyester fiber has an elongation of 1.65% to 2.5% when tensile strength of 1.0 g/d is applied after heat treatment at 185° C. for 2 minutes, and additionally elongates in the range of elongation from 0.5% to 5% at the range of tensile strength from 8.0 g/d to the maximum strength. The polyester fiber simultaneously has low initial Young's modulus and excellent mechanical properties, and thus, it may provide excellent packing, dimensional stability, and excellent air cut-off effect, and simultaneously, minimize impact applied to a passenger thus safely protecting a passenger.

21 Claims, 3 Drawing Sheets

(51) Int. Cl.
  *D01D 5/16* (2006.01)
  *D02G 3/44* (2006.01)
  *D01D 5/098* (2006.01)
  *D04H 3/011* (2012.01)
  *D02J 1/22* (2006.01)
  *D01D 10/02* (2006.01)
  *B60R 21/235* (2006.01)

(52) U.S. Cl.
  CPC .............. *D01F 6/62* (2013.01); *D02G 3/446* (2013.01); *D02J 1/224* (2013.01); *D04H 3/011* (2013.01); *B60R 2021/23509* (2013.01); *D10B 2331/04* (2013.01); *D10B 2505/124* (2013.01); *Y10T 428/249921* (2015.04)

(58) Field of Classification Search
  CPC ..... D02J 1/224; D04H 3/016; D10B 2331/04; D10B 2505/124; D02G 3/446; B60R 2021/23509
  See application file for complete search history.

(56) References Cited

U.S. PATENT DOCUMENTS

| | | | | |
|---|---|---|---|---|
| 4,851,508 | A * | 7/1989 | Kurita | D02J 1/22 264/176.1 |
| 5,474,836 | A | 12/1995 | Nishimura et al. | |
| 2005/0153609 | A1 | 7/2005 | Keshavaraj | |
| 2007/0243378 | A1 | 10/2007 | Cho et al. | |
| 2010/0261868 | A1 | 10/2010 | Lee | |
| 2011/0165806 | A1 | 7/2011 | Kim et al. | |
| 2012/0263401 | A1 * | 10/2012 | Jung | D01D 5/12 383/117 |

FOREIGN PATENT DOCUMENTS

| | | | |
|---|---|---|---|
| JP | 6-306728 | A | 11/1994 |
| JP | 6-306730 | A | 11/1994 |
| JP | 6-306731 | A | 11/1994 |
| JP | 7-48717 | A | 2/1995 |
| JP | 7-90746 | A | 4/1995 |
| JP | 0835116 | A | 2/1996 |
| JP | 8-134717 | A | 5/1996 |
| JP | 200213024 | A | 1/2002 |
| JP | 2002-327333 | A | 11/2002 |
| JP | 2005-240267 | A | 9/2005 |
| JP | 2007-182646 | A | 7/2007 |
| JP | 2013-522490 | A | 6/2013 |
| KR | 10-2009-0048377 | A | 5/2009 |
| KR | 10-2010-0029059 | A | 3/2010 |
| WO | 2009/061161 | A1 | 5/2009 |
| WO | WO 2011078513 | A2 * | 6/2011 ............... D01D 5/12 |

OTHER PUBLICATIONS

Huang et al, "High Performance Poly(ethylene terephthalate) Fibre Properties Achieved via High Speed Spinning with a Modified Liquid Isothermal Bath Process", Polymer, Elsevier Science Publishers B.V., Jan. 1, 1997, vol. 38, No. 5, pp. 1101-1110, XP004034296.

Lechat C., et al, "Mechanical behaviour of polyethylene terephthalate & polyethylene naphthalate fibres under cyclic loading", Journal of Materials Science, Kluwer Academic Publishers, BO, vol. 41, No. 6, Mar. 1, 2006, pp. 1745-1756, XP019211671, ISSN: 1573-4803, DOI: 10.1007/S10853-006-2372-X.3.

European Patent Office, Communication dated Jan. 27, 2014, issued in corresponding European Application No. 11825469.7.

* cited by examiner

POLYESTER FIBER AND METHOD FOR PREPARING THE SAME

CROSS REFERENCE TO RELATED APPLICATIONS

This application is a National Stage of International Application No. PCT/KR2011/006863 filed Sep. 16, 2011, claiming priority based on Korean Patent Application No. 10-2010-0092104 filed Sep. 17, 2010, the contents of all of which are incorporated herein by reference in their entirety.

BACKGROUND OF THE INVENTION (a) Field of the Invention

The present invention relates to polyester fiber that can be used as fabric for an airbag, specifically to high strength, high elongation and low Young's modulus polyester fiber having excellent mechanical properties, flexibility, dimensional stability, and the like, a method for preparing the same, and fabric for an airbag using the same.

(b) Description of the Related Art

In general, an airbag refers to a device that protects a driver and a passenger by sensing crash impact applied to a car at frontal crash of a car driving at a speed of about 40 km/h or more, and then, exploding gunpowder to supply gas in the airbag and expand it.

Properties required as fabric for an airbag includes low air permeability for smooth deployment at crash, high strength, high heat resistance for preventing damage and burst of an airbag itself, and flexibility for reducing impact applied to a passenger.

Particularly, an airbag used in an automobile is manufactured in a specific form, and then, to minimize the volume, it is installed on a car handle, side glass window or side structure, and the like in a folded state and maintains the folded state, and when an inflator is operated, it is allowed to expand and deploy.

Therefore, to effectively maintain foldability and packing of the airbag when installed in an automobile, prevent damage or burst of the airbag itself, exhibit excellent airbag cushion deployment performance, and minimize impact applied to a passenger, it is very important that the airbag fabric should have excellent mechanical properties and foldability as well as flexibility for reducing impact applied to a passenger. However, airbag fabrics that may maintain excellent air cut-off effect and flexibility for the safety of a passenger, sufficiently tolerate impact applied to the airbag, and be effectively installed in an automobile have not been suggested yet.

In the prior art, polyamide fiber such as nylon 66, and the like have been used as the material for yarn for an airbag. Although the nylon 66 has excellent impact resistance, it has decreased moisture heat resistance, light resistance, and dimensional stability compared to polyester fiber, and has high raw cost.

Meanwhile, Japanese Patent Laid-Open Publication No. 04-214437 suggested use of polyester fiber for reducing the above defects. However, if an airbag is manufactured using the existing polyester fiber, when installed in an automobile, packing in a small space is difficult due to high stiffness, excessive heat shrinkage may be generated by high temperature heat treatment due to high elasticity and low elongation, and there is a limit in maintaining sufficient mechanical properties and deployment performance under sever conditions of high temperature high moisture.

Accordingly, there is a need for development of fiber that may maintain excellent mechanical properties and air cut-off effect suitable for use as fabric for an airbag, and maintain flexibility for reducing impact applied to a passenger, packing and excellent mechanical properties under sever conditions of high temperature high moisture.

SUMMARY OF THE INVENTION

It is an aspect of the present invention to provide a polyester fiber that may exhibit excellent dimensional stability, mechanical properties, and flexibility, and maintain sufficient performances under severe conditions of high temperature and high moisture so that it can be used as fabric for an airbag.

It is another aspect of the present invention to provide a method for preparing the polyester fiber.

It is still another aspect of the present invention to provide fabric for an airbag prepared using the above polyester fiber.

The present invention provides a polyester fiber having elongation of 1.65% to 2.5% when tensile strength of 1.0 g/d is applied after heat treatment at 185° C. for 2 minutes, and additionally elongates in the range of elongation from 0.5% to 5% at the range of tensile strength from 8.0 g/d to the maximum tensile strength.

The present invention also provides a method for preparing the polyester fiber including the steps of melt spinning polyester polymer having intrinsic viscosity of 1.2 dl/g or more at 270 to 320° C. to prepare undrawn polyester yarn, and drawing the undrawn polyester yarn.

The present invention also provides fabric for an airbag prepared using the polyester fiber.

DETAILED DESCRIPTION OF THE EMBODIMENTS

Hereinafter, polyester fiber, a method for preparing the same, and fabric for an airbag prepared therefrom according to specific embodiments will be explained in detail. However, these are illustrated as one example, the scope of the invention is not limited thereto, and it would be obvious to one of ordinary knowledge in the art that various modifications may be made within the scope of the invention.

Unless otherwise described herein, the term "comprising" or "including" refers to include any constitutional element (or constitutional ingredient) without specific limitations, and it should not be construed as excluding addition of other constitutional elements (or constitutional ingredients).

Polyester fabric for an airbag may be manufactured by melt spinning polymer comprising polyethyleneterephthalate (hereinafter referred to as "PET") to prepare undrawn yarn, and drawing it to obtain drawn yarn, and then, weaving the obtained polyester fiber. Thus, the properties of the polyester fiber are directly or indirectly reflected on the properties polyester fabric for an airbag.

However, to apply polyester for fabric for an airbag instead of the existing polyamide fiber such as nylon 66, and the like, decrease in foldability due to high Young's modulus and stiffness, and the like, and deterioration of physical properties under sever conditions of high temperature high moisture due to low melting heat capacity, and the resulting deterioration of deployment performance of the existing polyester fiber should be overcome.

Particularly, polyester fiber should have properties of high strength, high elongation, and high dry heat shrinkage so as to be applied for fabric for an airbag, but the existing polyester fiber failed to simultaneously satisfy these excellent properties of strength, elongation and dry heat shrinkage. As such, in case the existing PET yarn is used, required properties are different compared to nylon, and thus, if heat treatment is conducted during preparation of fabric, strength and elongation of the fabric may become low and it may be difficult to provide excellent air cut-off effect due to lowered air tightness of the airbag fabric. Also, since the existing polyester fiber has stiff molecular chain, if it is used as fabric for an airbag and installed in an automobile, packing may be remarkably lowered. Furthermore, a carboxyl end group (hereinafter referred to as "CEG") in the polyester molecular chain may attack an ester bond under high temperature high moisture conditions to cause molecular chain cutting thus deteriorating physical properties after aging.

Accordingly, the present invention optimizes the ranges of physical properties of polyester fiber such as strength, elongation, shrinkage, initial Young's modulus, and the like, when heat treatment is applied, for example, during preparation of fabric for an airbag, thereby remarkably lowering stiffness while maintaining excellent mechanical properties such as toughness, and air cut-off performance, and the like, and thus, it can be effectively applied for fabric for an airbag.

Particularly, as the result of experiments of the inventors, it was found that by manufacturing fabric for an airbag from polyester fiber having specific properties, more improved foldability, dimensional stability, durability, and air cut-off effect may be exhibited, and thus, when used as fabric for an airbag, more excellent packing for automobile installation, excellent mechanical properties even under severe conditions of high temperature high moisture, and air outflow prevention, air tightness, and the like may be maintained.

Thus, according to one embodiment of the invention, a polyester fiber having specific properties is provided. The polyester fiber may have elongation of 1.65% to 2.5% when tensile strength of 1.0 g/d is applied after heat treatment at 185° C. for 2 minutes. Also, the polyester fiber may additionally elongate in the range of elongation from 0.5% to 5% at the range of tensile strength from 8.0 g/d to the maximum tensile strength.

The polyester fiber may preferably comprise polyethyleneterephthalate (PET) as a main ingredient. Various additives may be added during the manufacturing process, and to exhibit suitable properties for fabric for an airbag, the polyester fiber may comprise at least 70 mol %, more preferably at least 90 mol % of PET. Hereinafter, PET refers to a case where PET polymer content is 70 mol % or more, without specific explanations.

The polyester fiber according to one embodiment of the invention is manufactured under melt spinning and drawing conditions described below, and exhibits elongation of 1.65% to 2.5% when tensile strength of 1.0 g/d is applied after heat treatment at 185° C. for 2 minutes, and additionally elongates in the range of elongation from 0.5% to 5% at the range of tensile strength from 8.0 g/d to the maximum tensile strength.

As explained, due to the molecular structure property of common polyester, if it is heat treated during preparation of fabric, air tightness of the fabric for an airbag is lowered compared to nylon, and the like, and thus, it may be difficult to provide excellent air cut-off effect. Since polyester has a stiff molecular chain and a structure with high stiffness, it exhibits high Young's modulus, and when used as fabric for an airbag, packing and foldability are remarkably lowered, making it difficult to store in a narrow space in an automobile. However, the polyester fiber of the present invention obtained through controlled melt spinning and drawing processes using high viscosity chip exhibits high strength and low Young's modulus, and exhibits lower initial Young's modulus than previously known industrial polyester fiber. Particularly, the polyester fiber of the present invention simultaneously has low initial Young's modulus and minimized elongation.

Namely, the polyester fiber may have elongation of 1.65% to 2.5%, preferably 1.7% to 2.45% when tensile strength of 1.0 g/d is applied after heat treatment at 185° C. for 2 minutes, and may additionally elongates in the elongation range of 0.5% to 5%, preferably 0.7% to 4% at tensile strength of 8.0 g/d to maximum tensile strength. The polyester fiber may have elongation of 16% to 22%, preferably 16.5% to 21%, when tensile strength of 5.0 g/d is applied after heat treatment at 185° C. for 2 minutes. Particularly, the polyester fiber may have tensile strength of 4.5 g/d or more, or 4.5 to 7.0 g/d at 20% elongation after heat treatment at 185° C. for 2 minutes. Due to the low initial Young's modulus and low elongation properties, fabric for an airbag prepared from the high strength high elongation low Young's modulus polyester fiber may overcome high stiffness problem, and the like of the existing PET fabric, and exhibit excellent foldability, flexibility and packing.

According to the present invention, by controlling strength-elongation curve in the optimum range so as to absorb impact energy instantaneously generated when an airbag is operated, mechanical properties and foldability, and the like of the final fabric may be improved. To afford excellent air tightness and foldability so that fabric may initially safely absorb instantaneous impact energy of exhaust gas generated due to explosion in the airbag, and simultaneously, may be effectively deployed, high strength, high elongation and low initial Young's modulus are required. Particularly, considering that heat treatment is conducted when fabric is prepared, the strength-elongation curve the yarn should satisfy the above explained elongation range under the strength conditions, after heat treatment under specific conditions.

Meanwhile, the polyester fiber may elongate 0.8% to 2.0%, preferably 0.85% to 1.5% when tensile strength of 1.0 g/d is applied at room temperature (25° C., Celsius) without heat treatment, and additionally elongate in the range of elongation from 1.5% to 5%, preferably 1.7% to 4.7% at the range of tensile strength from 8.8 g/d to the maximum tensile strength. Also, the polyester fiber may elongate 6.5% to 16.5%, preferably 7.2% to 14.0% when tensile strength of 5.0 g/d is applied at room temperature.

The elongation of the polyester fiber measured after heat treatment at 185° C. for 2 minutes may be 105% or more, or 105% to 160%, preferably 108% or more, or 108% to 150%, more preferably 112% or more, or 112% to 140%, based on the elongation of the fiber measured at room temperature. The tensile strength of the polyester fiber measured after heat treatment at 185° C. for 2 minutes may be 90% or more, or 90% to 100%, preferably 91.5% or more, or 91.5% to 100%, based on the tensile strength of the yarn measured at room temperature. As such, the polyester fiber of the present invention may minimize lowering of strength and elongation of the yarn even after heat treatment at 185° C. for 2 minutes, and particularly, rather increase elongation without lowering of strength, thereby affording excellent mechanical properties and high dimensional stability and foldability when manufactured into fabric for an airbag, and simultaneously providing improved air cut-off effect.

The maximum tensile strength of the polyester fiber at breaking point where yarn is broken by tension applied to the fiber may be 8.1 g/d to 9.5 g/d, preferably 8.3 g/d to 9.3 g/d, more preferably 8.4 g/d to 9.0 g/d, in the strength elongation curve measured after heat treatment at 185° C. for 2 minutes. The maximum elongation of the polyester fiber, measured after treatment at 185° C. for 2 minutes may be 20% to 35%, preferably 21% to 32%, more preferably 22% to 28%. The maximum strength of the polyester fiber at breaking point where yarn is broken by tension applied to the yarn may be 8.9 g/d to 11.0 g/d, preferably 9.0 g/d to 10 g/d, more preferably 9.1 g/d to 9.8 g/d, in the strength elongation curve measured at room temperature (25° C.). The maximum elongation of the polyester fiber measured at room temperature (25° C.) may be 15% to 30%, preferably 16% to 26%, more preferably 17% to 25%.

Meanwhile, the polyester fiber of the present invention may have Young's modulus of 55 to 70 g/de, preferably 58 to 67 g/de at 1% elongation, namely at the point that the fiber elongates 1%, and 35 to 52 g/de, preferably 38 to 48 g/de at 2% elongation, namely, at the point that the fiber elongates 2%, as measured by American Society of Testing Materials (ASTM) D 885 after the heat treatment. The polyester fiber may have Young's modulus of 60 to 110 g/de, preferably 75 to 105 g/de at 1% elongation, namely at the point that the fiber elongates 1%, and 50 to 87 g/de, preferably 55 to 85 g/de at 2% elongation, namely, at the point that the fiber elongates 2%, as measured by ASTM D 885 at room temperature. The common industrial polyester fiber has Young's modulus of 72 g/de or more and 115 g/de or more, at 1% elongation, respectively measured after heat treatment and at room temperature. Also, the common industrial polyester fiber has Young's modulus of 53 g/de or more and 90 g/de or more, at 2% elongation, respectively measured after heat treatment and at room temperature. Thus, the polyester fiber of the present invention has remarkably low Young's modulus even after heat treatment as well as at room temperature.

The Young's modulus of the polyester fiber is property value of elastic coefficient obtained from the slope of the elastic section in a stress-strain diagram obtained from tensile test, and it corresponds to modulus of elasticity exhibiting the degree of stretching and deformation when an object is stretched from both sides. If the Young's modulus of fiber is high, elasticity is good but stiffness of the yarn may be deteriorated, and if the Young's modulus is too low, stiffness of the yarn is good, but elastic recovery may be lowered and thus toughness may be deteriorated. As such, fabric for an airbag prepared from polyester fiber having low initial Young's modulus compared to the existing polyester fiber, even after heat treatment as well as at room temperature may overcome high stiffness problem, and the like of the existing polyester fiber, and exhibit excellent foldability, flexibility, and packing.

The polyester fiber may exhibit more improved intrinsic viscosity than the existing polyester fiber, specifically intrinsic viscosity of 0.8 dl/g or more, or 0.8 dl/g to 1.2 dl/g, preferably 0.85 dl/g or more, or 0.85 dl/g to 1.15 dl/g, more preferably 0.9 dl/g or more, or 0.9 dl/g to 1.1 dl/g. When the polyester fiber is applied for fabric for an airbag, it may be preferable to secure the intrinsic viscosity within the above range so as not to generate thermal deformation during a coating process, and the like.

The polyester fiber preferably has intrinsic viscosity of 0.8 dl/g or more so as to manifest high strength with low draw ratio to satisfy strength required for airbag yarn. Otherwise, it can only manifest properties with high draw ratio. If high draw ratio is applied, the orientation degree of fiber may increase to exhibit high Young's modulus property, thus making it difficult to achieve excellent foldability of the fabric. Thus, it is preferable to maintain intrinsic viscosity of the yarn 0.8 dl/g or more so as to apply low draw ratio to manifest low Young's modulus. If the viscosity of the yarn is 1.2 dl/g or more, draw tension may increase at drawing to cause process problem, and thus, it may be preferably 1.2 dl/g or less. Particularly, the polyester fiber of the present invention maintains intrinsic viscosity to such a high degree, thereby providing low stiffness with low draw ratio, and simultaneously providing sufficient mechanical property, and high strength properties such as impact resistance, toughness, and the like to fabric for an airbag.

Therefore, it is possible to prepare fabric for an airbag simultaneously exhibiting excellent mechanical properties, packing, dimensional stability, impact resistance, and air cut-off effect, using polyester fiber exhibiting low initial Young's modulus and high elongation, preferably high intrinsic viscosity. Thus, using the polyester fiber, fabric for an airbag exhibiting excellent impact resistance, dimensional stability, mechanical properties, and air tightness while exhibiting lower stiffness, and foldability, and packing may be obtained. The polyester fabric for an airbag exhibits excellent mechanical properties, dimensional stability, and air cut-off effect, provides excellent foldability and packing when installed in a narrow space in an automobile, and minimizes impact applied to a passenger due to excellent flexibility to safely protect a passenger. Thus, it may be preferably applied for fabric for an airbag, and the like.

Further, since the polyester fiber of the present invention is manufactured under the melt spinning and drawing conditions as described below, it may exhibit significantly lowered carboxyl end group (CEG) content than the existing polyester fiber. Namely, the polyester fiber may exhibit CEG content of 45 meq/kg or less, preferably 40 meq/kg or less, more preferably 35 meq/kg or less. The carboxyl end group (CEG) in the polyester molecular chain attacks an ester bond under high temperature high moisture conditions to cause molecular chain cutting and thus deteriorating properties after aging. Particularly, if the CEG content of the polyester fiber exceeds 45 meq/kg, an ester bond is cut by CEG under high moisture condition to cause property deterioration, when the fiber is applied for an airbag. Therefore, the CEG content may be preferably 45 meq/kg or less.

Meanwhile, as explained above, after heat treatment at 185° C. for 2 minutes, the polyester fiber according to one embodiment of the invention may have tensile strength of 8.1 g/d to 9.5 g/d, preferably 8.3 g/d to 9.3 g/d, more preferably 8.4 g/d to 9.0 g/d, and elongation at break of 20% to 35%, preferably 21% to 32%, more preferably 22% to 28%. Also, at room temperature without heat treatment, the tensile strength of the fiber may be 8.9 g/d to 11.0 g/d, preferably 9.0 g/d to 10 g/d, more preferably 9.1 g/d to 9.8 g/d, and the elongation at break may be 15% to 30%, preferably 16% to 26%, more preferably 17% to 25%.

The polyester fiber may exhibit toughness of 70 to 120 J/m$^3$, as defined by the following Calculation Formula 1.

$$\text{Toughness (work of rupture)} = \int_0^{strain} F \cdot dl \quad \text{[Calculation Formula 1]}$$

In the Calculation Formula 1, F denotes the load applied when the length of the polyester fiber is increased by dl; and dl is the increment of the length of the polyester fiber.

Since the polyester fiber has high toughness (work of rupture) compared to the existing polyester fiber, it may effectively absorb and stand high temperature-high pressure gas energy. Particularly, toughness of the fiber, calculated according to the Calculation Formula 1 from the strength elongation curve of the fiber after heat treatment at 185° C. for 2 minutes, may be 70 J/m$^3$ to 120 J/m$^3$, preferably 75 J/m$^3$ to 110 J/m$^3$. Toughness of the fiber measured at room temperature may be 70 J/m$^3$ to 120 J/m$^3$, preferably 85 J/m$^3$ to 115 J/m$^3$. Since the polyester fiber of the present invention has high strength, high elongation, and low initial Young's modulus properties, it may minimize lowering of tensile strength and secures improved elongation even after heat treatment at 185° C. for 2 minutes. Thus, it may secure excellent toughness in the same range as toughness measured at room temperature. However, according to circumstances, the toughness of the polyester fiber measured after heat treatment at 185° C. for 2 minutes may be 90% or more, preferably 93% or more, more preferably 95% or more of the toughness of the fiber measured at room temperature. As the polyester fiber of the present invention exhibits high toughness at room temperature and after heat treatment, it may effectively absorb and stand high temperature-high pressure gas energy. Therefore, it may be very effectively used as fabric for an airbag.

Figure 2:
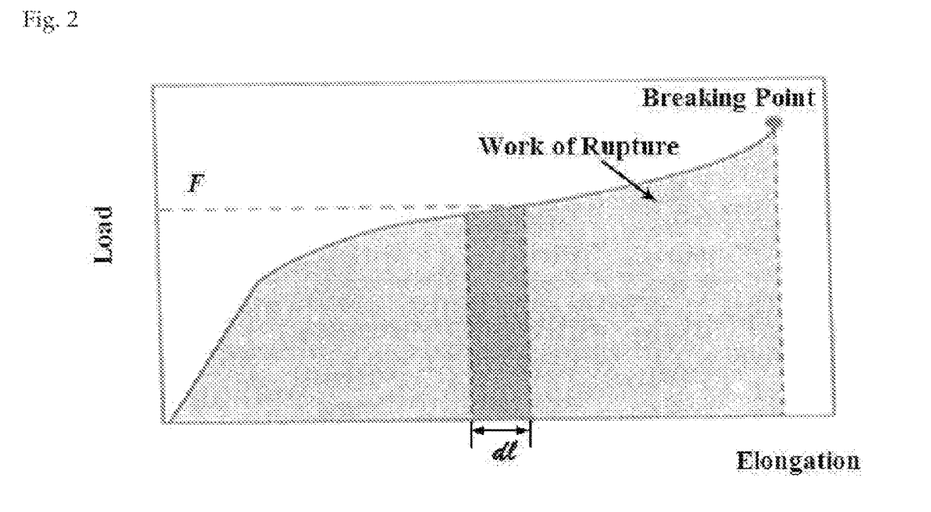
FIG. 2 shows en example of strength-elongation curve of common fiber, and the area of the strength-elongation curve may be defined as toughness (work of rupture, J/ms).

Toughness is energy consumed until fiber (including yarn or fabric) is broken by tension as represented by the Calculation Formula 1, and it means resistance of fiber to sudden impact. When the length of fiber increases from 1 to 1+dl at load F, the work is F·dl, and thus, toughness required to break the fiber is as described the Calculation Formula 1. Namely, the toughness is represented by the cross sectional area of the strength elongation curve of yarn and fabric (see FIG. 2), and as the strength and elongation of the yarn used for fabric are higher, toughness of the fabric becomes high. Particularly, if the toughness of fabric for an airbag becomes low, resistance of the fabric for sufficiently absorbing instantaneous deployment impact of an inflator having high temperature-high pressure becomes low when an airbag is deployed, thus causing tearing of the fabric for an airbag. Therefore, if the toughness of the polyester fabric for an airbag is for example less than 70 kJ/m$^3$, it may be difficult to use as fabric for an airbag.

As explained above, by securing optimum ranges of intrinsic viscosity, initial Young's modulus, and elongation, the polyester fiber of the present invention may exhibit excellent strength and properties, and manifest excellent performance when prepared into fabric for an airbag.

Particularly, polyester fiber according to one embodiment of the invention may exhibit dry heat shrinkage measured at room temperature of 1.0% or more, or 1.0% to 10%, preferably 1.5% or more, or 1.5% to 8.0%, more preferably, 2.0% or more, or 2.0% to 6.0%. As such, by maintaining optimum range of dry heat shrinkage of the polyester fiber, excellent strength and flexibility may be achieved with high strength, high elongation, low Young's modulus properties, and simultaneously, air permeability of the fabric may be effectively controlled through excellent shrinkage property, and mechanical properties such as edge comb resistance may be improved.

The shrinkage stress of the polyester fiber may be preferably 0.005 to 0.075 g/d at 150° C. corresponding to laminate coating temperature of common coated fabric, and 0.005 to 0.075 g/d at 200° C. corresponding to sol coating temperature of common coated fabric. Namely, shrinkage stress at 150° C. and 200° C. should be respectively 0.005 g/d or more so as to prevent fabric deflection due to heat during a coating process, and should be 0.075 g/d or less so as to mitigate relaxation stress when the fabric is cooled at room temperature after a coating process. The shrinkage stress is based on the value measured under constant load of 0.10 g/d.

As explained above, to prevent deformation in a heat treatment process such as coating, and the like, the polyester fiber may have degree of crystallization of 40% to 55%, preferably 41% to 52%, more preferably 41% to 50%. The degree of crystallization of the yarn should be 40% or more so as to maintain thermal dimensional stability when the yarn is applied for fabric for an airbag. If the degree of crystallization is greater than 55%, a non-crystalline region may decrease to lower impact absorption performance, and thus, the degree of crystallization may be preferably 55% or less.

The polyester fiber may have single yarn fineness 2.5 to 6.8 DPF, preferably 2.92 to 4.55 DPF. Low fineness and high strength should be maintained in terms of foldability of the cushion and absorption performance for absorbing high temperature-high pressure deployment energy when the airbag is deployed so that the fiber may be effectively used for fabric for an airbag. Thus, total fineness of the fiber may be 400 to 650 deniers. As the number of filaments of the yarn is larger, soft feel may be afforded, but if it is too large, spinnability may not be good, and thus, the number of filaments may be 96 to 100.

Meanwhile, the polyester fiber according to one embodiment of the invention may be prepared by melt spinning PET to prepare undrawn yarn, and drawing the undrawn yarn. As explained above, specific conditions or methods of each step may be directly/indirectly reflected in the properties of polyester fiber and polyester fiber having the above explained properties may be prepared.

Particularly, it was found out that through the above process optimization, polyester fiber for an airbag that has elongation of 1.65% to 2.5% when tensile strength of 1.0 g/d is applied after heat treatment at 185° C. for 2 minutes may be obtained. Further, the polyester fiber may additionally elongate in the elongation range of 0.5% to 5% at tensile strength of 8.0 g/d to maximum tensile strength. It was also found out that through the optimization of melt spinning and drawing processes, CEG (Carboxyl End Group) which exists as acid under high moisture condition to induce cutting of the basic molecular chain of polyester fiber may be minimized. Thus, the polyester fiber may simultaneously exhibit low initial Young's modulus and high elongation, and thus, may be preferably applied for fabric for an airbag having excellent mechanical properties and packing, dimensional stability, impact resistance, and air cut-off effect.

Hereinafter, the method for preparing the polyester fiber will be explained in detail according to each step.

The method for preparing the polyester for an airbag comprises the steps of melt spinning polyester polymer having intrinsic viscosity of 1.2 dl/g or more at 270 to 320° C. to prepare undrawn polyester yarn, and drawing the undrawn polyester yarn.

First, referring to the attached drawings, the melt spinning and drawing processes are explained so that one of ordinary knowledge in the art may easily work.

Figure 1:
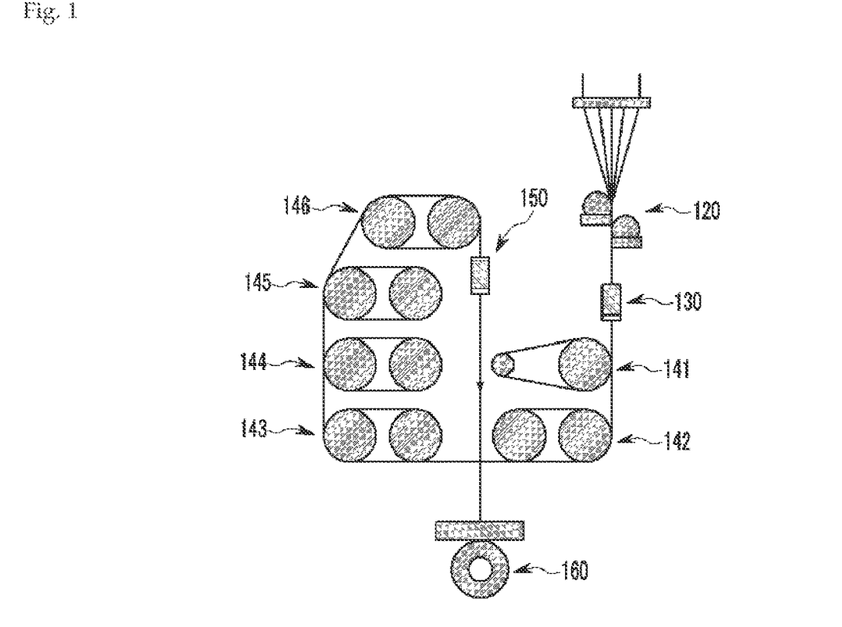
FIG. 1 is a process drawing schematically showing a preparation process of polyester fiber for an airbag according to one embodiment of the invention.

FIG. 1 is a process drawing schematically showing the preparation process of polyester fiber comprising the melt spinning and drawing steps. As shown in FIG. 1, according to the method for preparing polyester fiber for an airbag of the present invention, a polyester chip prepared by the above explained method is molten, the molten polymer is spun through a spinner and cooled with quenching-air, an emulsion is provided to undrawn yarn using an emulsion roll (120) (or oil-jet), the emulsion provided to the undrawn yarn is uniformly dispersed on the surface of the yarn with constant air pressure using a pre-interlacer (130). Then, a drawing process is conducted through multi-staged drawing machine (141-146), and finally, the yarn is intermingled with constant pressure in a $2^{nd}$ Interlacer (150) and winded in a winder (160) to produce yarn.

First, the manufacturing method of the present invention melt spins high viscosity polymer including polyethyleneterephthalate to prepare undrawn polyester fiber.

At this time, to obtain undrawn polyester fiber satisfying low initial Young's modulus and high elongation range, the melt spinning process may be preferably conducted at low temperature range so as to minimize thermal decomposition of the PET polymer. Particularly, spinning may be conducted at low temperature, for example, at 270 to 320° C., preferably 273 to 315° C., more preferably 275 to 310° C., still more preferably 280 to 300° C., so as to minimize degradation of properties such as intrinsic viscosity and CEG content of high viscosity PET polymer, namely, to maintain high intrinsic viscosity and low CEG content of polyester polymer. The spinning temperature refers to the temperature of an extruder, and if the melt spinning is conducted at temperature greater than 320° C., thermal decomposition of the PET polymer may be generated a lot. Thus, intrinsic viscosity of the fiver may be lowered to decrease molecular weight and increase CEG content and general properties degradation may be caused due to surface damage of the yarn. Meanwhile, if the melt spinning is conducted at a temperature less than 270° C., it may be difficult to melt the PET polymer, and spinnability may be lowered due to N/Z surface cooling. Thus, the melt spinning process may be preferably conducted in the above temperature range.

As the result of experiments, it was found out that by progressing melt spinning of PET at the low temperature range to minimize decomposition of PET polymer and maintain high intrinsic viscosity. Thus, the fiber having high molecular weight and high strength yarn may be obtained without applying high draw ratio in the subsequent drawing process. Also, since a low draw ratio process may be conducted, Young's modulus may be effectively lowered and polyester satisfying the above explained properties may be obtained.

In the melt spinning process, the melt spinning speed of the PET polymer may be controlled to low speed of 300 to 1,000 m/min, preferably 350 to 700 m/min, so as to progress under lower spinning tension, namely, to minimize spinning tension for minimizing decomposition of the polyester polymer. By selectively progressing the melt spinning process of PET under low spinning tension and low spinning speed, decomposition of PET may be further minimized.

Meanwhile, the undrawn yarn obtained by the melt spinning process may exhibit intrinsic viscosity of 0.8 dl/g or more, or 0.8 dl/g to 1.2 dl/g, preferably 0.85 dl/g or more, or 0.85 dl/g to 1.15 dl/g, more preferably 0.90 dl/g or more, or 0.9 to 1.10 dl/g. The CEG content of the undrawn yarn obtained by the low temperature spinning may be 45 meq/kg or less, preferably 40 meq/kg or less, more preferably 35 meq/kg or less. The CEG content in the molecule of the undrawn yarn may be maintained at the same level in the drawn yarn after conducting a subsequent drawing process, namely in the polyester fiber.

Particularly, as explained above, to manufacture high strength low Young's modulus polyester fiber, it may be preferable to use high viscosity PET polymer, for example PET polymer with intrinsic viscosity of 1.2 dl/g or more, or 1.2 to 2.0 dl/g, preferably 1.25 dl/g or more, or 1.25 to 1.85 dl/g, in the manufacturing process of undrawn yarn, and to maximally maintain the high viscosity range through melt spinning and drawing processes, so as to manifest high strength at low draw ratio to effectively lower Young's modulus. However, to prevent cutting of molecular chain due to increase in melting temperature of the PET polymer, and pressure increase due to discharge rate in the spinning pack, intrinsic viscosity may be preferably 2.0 dl/g or less.

Meanwhile, the CEG content in the PET polymer molecule may be preferably 30 meq/kg or less so that the prepared polyester fiber may maintain excellent properties even under high temperature high moisture conditions when applied for fabric for an airbag. The CEG content of the PET polymer is preferably maintained as possible as low even after progressing melt spinning and drawing processes so that the finally prepared polyester fiber may exhibit high strength, excellent dimensional stability, mechanical properties, and excellent properties under severe conditions. In this regard, if the CEG content of the PET chip is greater than 30 meq/kg, the CEG content in the molecule of polyester fiber finally prepared through melt spinning and drawing processes may excessively increase, for example, exceeding 30 meq/kg to 45 mq/kg, and an ester bond may be cut by CEG under high moisture condition to cause degradation of properties of yarn itself and fabric prepared therefrom.

Particularly, by conducting melt spinning of the PET polymer having high viscosity and low CEG content under the above explained low temperature condition to maximally inhibit thermal decomposition of the PET polymer, intrinsic viscosity and CEG content differences between the PET polymer and polyester fiber may be minimized. For example, melt spinning and subsequent processes may be conducted so that intrinsic viscosity difference between the PET polymer and polyester fiber may be optimized. The difference between the intrinsic viscosity of PET polymer and the intrinsic viscosity of polyester fiber may become 0.7 dl/g or less, or 0 to 0.7 dl/g, preferably 0.5 dl/g or less, or 0.1 to 0.5 dl/g. Also, the processes may be conducted so that CEG content difference between the PET polymer and polyester fiber may become 20 meq/kg or less, or 0 to 20 meq/kg, preferably 15 meq/kg or less, or 3 to 15 meq/kg.

The present invention may maximally inhibit lowering of intrinsic viscosity and increase in CEG content of PET polymer, thereby maintaining excellent mechanical properties of polyester fiber and simultaneously securing excellent elongation, and preparing high strength low Young's modulus yarn suitable for fabric for an airbag.

Also, the PET chip may be preferably spun through a spinner designed such that the fineness of monofilament may become 2.5 to 6.8 DPF, preferably 2.92 to 4.55 DPF. Namely, to lower the possibility of yarn cutting during spinning and yarn cutting due to interference during cooling, denier of monofilament may be preferably 2.5 DPF or more, and to increase cooling efficiency, fineness of monofilament may be preferably 6.8 DPF or less.

After melt spinning the PET, a cooling process may be additionally conducted to manufacture the undrawn PET yarn. The cooling process may be preferably progressed by adding cooling air of 15 to 60° C., and the cooling air volume may be preferably controlled to 0.4 to 1.5 m/s. Thereby, the undrawn PET yarn exhibiting all the properties according to one embodiment of the invention may be more easily manufactured.

Meanwhile, after manufacturing undrawn polyester yarn through the spinning, the undrawn yarn is drawn to manufacture drawn yarn. The drawing process may be conducted at total draw ratio of 5.0 to 6.5, preferably 5.0 to 6.2. The undrawn polyester yarn maintains high intrinsic viscosity and low initial Young's modulus and has minimized CEG content in the molecule by optimization of the melt spinning process. Thus, if the drawing process is progressed at high draw ratio greater than 6.5, excessive drawing may occur to generate yarn cutting or pilling, and yarn with low elongation and high Young's modulus may be manufactured due to high fiber orientation degree. Particularly, in case elongation of the yarn is lowered and Young's modulus is increased under high draw ratio condition, applicability and packing may not be good when applied for fabric for an airbag. To the contrary, if a drawing process is progressed under relatively low draw ratio, fiber orientation degree may be low, and thus, the strength of polyester fiber prepared therefrom may be partially lowered. However, if a drawing process is progressed under draw ratio of 5.0 or more, high strength low Young's modulus polyester fiber suitable for application for fabric for an airbag, and the like may be manufactured. Thus, the drawing process may be preferably progressed under draw ratio of 5.0 to 6.5.

According to another embodiment of the invention, to manufacture low Young's modulus polyester fiber simultaneously satisfying high strength and low shrinkage by direct spinning and drawing, a high viscosity polyethyleneterephthalate polymer chip is melt-spun, and then, passed through a multi-staged godet roller, and subjected to drawing, heat setting, relaxing and winding until winded in a winder.

The drawing process may be conducted after the undrawn yarn is passed through a godet roller under oil pick amount of 0.2% to 2.0%.

In the relaxing process, relaxation rate may be 14% or less, or 1% to 14%, preferably 10% or less, or 1% to 10%, more preferably 7% or less, or 1.1% to 7%. The lower limit of the relaxation rate may be selected within the range allowing sufficient shrinkage, and for example, it may be 1% or more. According to circumstances, if the relaxation rate is too low, for example, if it is less than 1%, it may be difficult to manufacture high elongation low Young's modulus fiber due to high fiber orientation, like under high draw ratio, and if it is greater than 14%, vibration of yarn may become serious on the godet roller and thus operability may not be secured.

In the drawing process, a heat setting process for heat treating the undrawn yarn at approximately 170 to 250° C. may be further conducted, and preferably, to appropriately progress the drawing process, it may be conducted at 172 to 245° C., more preferably 175 to 220° C. If the temperature is less than 170° C., thermal effect may not be sufficient to lower relaxation efficiency, and thus, shrinkage may not be achieved. If it is greater than 250° C., yarn strength may be lowered due to thermal decomposition and a lot of tar may be generated on the roller, and thus operability may be lowered. Particularly, if the heat setting process is conducted at a lower temperature range to control relaxation efficiency in the optimum range, excellent air tightness may be achieved due to optimized shrinkage property when prepared into fabric for an airbag.

The winding speed may be 2,000 to 4,000 m/min, preferably 2,500 to 3,700 m/min.

According to yet another embodiment of the invention, polyester fabric for an airbag comprising the above explained polyester fiber is provided.

As used herein, "fabric for an airbag" refers to woven fabric or non-woven fabric used for preparation of an airbag for an automobile, and it is manufactured using the polyester fiber prepared by the above processes.

Particularly, the present invention may provide polyester fabric for an airbag having excellent energy absorption performance when the airbag is expanded, excellent dimensional stability, air cut-off performance, excellent foldability, flexibility, and packing, by using polyester fiber having high strength-high elongation and low Young's modulus instead of the existing polyester fiber having high strength-low elongation and high Young's modulus. Also, the fabric for an airbag may have excellent room temperature properties, and maintain excellent mechanical properties and air tightness, and the like even after aging under high temperature high moisture conditions.

More specifically, the fabric for an airbag of the present invention may have tensile strength of 200 to 370 kgf/inch, preferably 210 to 340 kgf/inch, as measured at room temperature by American Society for Testing and Materials Standards (ASTM) D 5034. The tensile strength may be preferably 200 kgf/inch or more in terms of properties required in the existing airbag, and it may be preferably 370 kgf/inch or less for a practical property manifestation.

The fabric for an airbag may have elongation at break of 20% to 60%, preferably 30% to 50%, as measured at room temperature by American Society for Testing and Materials Standards ASTM D 5034. The elongation at break may be preferably 20% or more in terms of properties required in the existing airbag, and it may be preferably 60% or less for a practical property manifestation.

The polyester fabric may have toughness of 3.5 to 6.0 kJ/m$^3$, as defined by the following Calculation Formula 2.

$$\text{Toughness (work of rupture)} = \int_0^{strain} F \cdot dl \quad \text{[Calculation Formula 2]}$$

In the Calculation Formula 2, F denotes the load applied when the length of the polyester fabric is increased by dl; and dl is the increment of the length of the polyester fabric.

Since the polyester fabric has high toughness compared to the existing polyester fabric, it may effectively absorb and stand high temperature-high pressure gas energy. Particularly, since the polyester fabric for an airbag exhibits toughness of 3.5 kJ/m$^3$ to 6.0 kJ/m$^3$, preferably 3.8 kJ/m$^3$ to 5.7 kJ/m$^3$, it may effectively absorb and stand high temperature-high pressure gas energy, and thus, it may be very effectively used for yarn and fabric for an airbag. If the toughness of fabric for an airbag is lowered, resistance of fabric for sufficiently absorbing instantaneous deployment impact of an inflator having high temperature-high pressure when the airbag is deployed may decrease, thus causing easy tearing of fabric for an airbag. Thus, if the toughness of fabric is for example less than 3.5 kJ/m$^3$, it may be difficult to apply for fabric for an airbag.

The polyester fabric requires excellent tear strength because it is rapidly expanded by high temperature-high pressure gas, and tear strength of non-coated fabric, which shows bursting strength of the fabric for an airbag, may be 18 to 30 kgf, as measured by ASTM D 2261 TONGUE, and the tear strength of coated fabric may be 30 to 60 kgf, as measured by ASTM D 2261 TONGUE. If the tear strengths of non-coated and coated fabric for an airbag are respectively less than 18 kgf and 30 kgf, airbag may be burst when the airbag is deployed, thus causing significant danger in the airbag function. To the contrary, if the tear strengths of non-coated and coated fabric for an airbag are respectively greater than 30 kgf and 60 kgf, the edge comb resistance of the fabric may decrease, and air cut-off performance may be rapidly lowered when the airbag is deployed.

As explained, since the polyester fabric uses high strength high elongation low Young's modulus yarn having excellent shrinkage property, excellent edge comb resistance may be achieved to simultaneously improve mechanical properties, energy absorption for high temperature high pressure gas and foldability of the final fabric. Particularly, the polyester fabric may have edge comb resistance of 350 N or more, or 350 to 1,000 N, preferably 380 N, or 380 to 970 N, as measured at room temperature (25° C.) according to ASTM D 6479. Also, the polyester fabric may have edge comb resistance of 300 N or more, or 300 to 970 N, preferably 320 N or more, or 320 to 950 N, as measured at 90° C. In case that the edge comb resistance of the polyester fabric is less than 350 N and less than 300 N respectively measured at room temperature (25° C.) and 90° C., fabric strength of the airbag cushion sewing part may be rapidly deteriorated when the airbag is deployed. Thus, a tearing of the fabric may occur due to pin hole generation and pushed seam when the airbag is practically deployed.

For the air tightness of the polyester fabric, it should stand tension due to high pressure air, and the like and have minimum elongation, and for sufficient mechanical properties when the airbag is operated, it is very important to have maximum energy absorption when high temperature high pressure gas is discharged. Accordingly, the fabric is woven to have a cover factor optimized in the range of 1,800 to 2,460, preferably 1,880 to 2,360, as given by the following Calculation Formula 3, thereby enhancing packaging performance and energy absorption performance in the event of airbag unfolding.

$$\text{Cover factor (CF)} = \text{warp density (thread/inch)} \times \sqrt{\text{warpdenier}} + \text{weft density (thread/inch)} \times \sqrt{\text{weftdenier}}$$

[Calculation Formula 3]

If the cover factor of the fabric is less than 1,800, air may be easily discharged outside when the air is expanded, and if the cover factor of the fabric is greater than 2,460, packing and foldability of the airbag cushion may be largely lowered when the airbag is installed.

The fabric for an airbag according to the present invention may have fabric shrinkage in warp/weft directions of respectively 1.0% or less, preferably 0.8% or less, as measured by ASTM D 1776, and after aging, the fabric shrinkage in warp/weft directions may be respectively 1.0% or less, preferably 0.8% or less. For dimensional stability of fabric, it is preferable that the fabric shrinkage in warp/weft directions may not exceed 1.0%.

As explained, the polyester fabric may maintain toughness and tear strength and simultaneously remarkably lower stiffness, by using polyester fiber having high strength low Young's modulus property. The fabric for an airbag may exhibit stiffness according to ASTM D 4032 of 1.5 kgf or less, or 0.3 to 1.5 kgf, preferably 1.2 kgf or less, or 0.3 to 1.2 kgf, more preferably 0.8 kgf or less, or 0.3 to 0.8 kgf. Since stiffness may be remarkably lowered compared to the existing polyester fabric, the fabric for an airbag of the present invention may exhibit excellent foldability and flexibility, and improved packing when the airbag is installed.

The yarn preferably maintain the above stiffness range so that it may be applied for an airbag, and if the stiffness is too low, sufficient protection and support functions may not be achieved when the airbag is expanded and deployed, and dimensional stability may be lowered when installed in an automobile thus lowering packing. Also, to prevent lowering of packing caused by difficulty in folding due to too stiff state, the stiffness may be preferably 1.5 kgf or less, and particularly, in case the yarn has less than 460 deniers, the stiffness may be preferably 0.8 kgf or less, and in case it has less than 550 deniers, the stiffness may be preferably 1.5 kgf or less.

The static air permeability of the non-coated fabric according to ASTM D 737 may be 10.0 cfm or less, or 0.3 to 10.0 cfm, preferably 8.0 cfm or less, or 0.3 to 8.0 cfm, more preferably 5.0 cfm or less, or 0.3 to 5.0 cfm, in case $\Delta P$ is 125 pa. Also, the static air permeability of the non-coated fabric may be 14 cfm or less, or 4 to 14 cfm, preferably 12 cfm or less, or 4 to 12 cfm, in case $\Delta P$ is 500 pa. The dynamic air permeability may be 1,700 mm/s or less, preferably 1,600 mm/s or less, or 200 to 1,600 mm/s, more preferably 1,400 mm/s or less, or 400 to 1,400 mm/s. The static air permeability refers to the amount of air that permeates through fabric when constant pressure is applied to the fabric for an airbag, and it may be lower as denier per filament of the fabric is smaller and the density of the fabric is higher. Also, dynamic air permeability refers to a degree of air permeation through fabric when average instantaneous differential pressure of 30 to 70 kPa is applied, and it may be lower as denier per filament of the fabric is smaller and the density of the fabric is higher, like the static air permeability.

Particularly, the air permeability of the polyester fabric may be remarkably lowered by including a rubber-based coating layer in the fabric, and the air permeability close to 0 cfm may be achieved. However, in case the rubber coating is conducted, the static air permeability of the coated fabric for an airbag according to ASTM D 737 may be 0.1 cfm or less, or 0 to 0.1 cfm, preferably 0.05 cfm or less, or 0 to 0.05 cfm, in case $\Delta P$ is 125 pa, and 0.3 cfm or less, or 0 to 0.3 cfm, preferably 0.1 cfm or less, or 0 to 0.1 cfm, in case $\Delta P$ is 500 pa.

If the static air permeability or the dynamic air permeability of the non-coated and coated polyester fabric exceed the above upper limits, it may not be preferable in terms of maintaining air tightness of the fabric for an airbag.

According to yet another embodiment of the invention, a manufacturing method of fabric for an airbag using polyester fiber is provided. The manufacturing method of the fabric for an airbag comprises weaving raw fabric for an airbag using the above polyester fiber, scouring the woven fabric for an airbag, and heat setting the refined fabric.

The polyester fiber may be passed through a common weaving, scouring and heat setting processes and prepared into a final fabric for an airbag. The weave type is not specifically limited, and both plain weave type and one piece woven (OPW) type may be preferable.

Particularly, the fabric for an airbag of the present invention may be prepared by passing beaming, weaving, scouring and heat setting processes using the polyester fiber as warp and weft. The fabric may be prepared using a common weaving machine, and the weaving machine is not specifically limited. However, the plain weave type fabric may be prepared using Rapier Loom, Air Jet Loom, or Water Jet Loom, and the like, and the OPW type fabric may be prepared using Jacquard Loom.

Further, the fabric for an airbag of the present invention may preferably further comprise a surface coated or laminated coating layer consisting of at least one of silicon resin, polyvinylchloride resin, polyethylene resin, polyurethane resin, and the like, but the kind of coating resin is not limited thereto. The resin coating layer may be applied by knife coating, doctor blade, or spray coating method, but not limited thereto.

The coating amount of the resin coating layer per unit area may be 20 to 200 g/m$^2$, preferably 20 to 100 g/m$^2$. Particularly, in the case of OPW type fabric for a side curtain airbag, the coating amount may be preferably 30 g/m$^2$ to 95 g/m$^2$, and in the case of a plain weave type fabric for an airbag, the coating amount may be preferably 20 g/m$^2$ to 50 g/m$^2$.

The coated fabric for an airbag is passed cutting out and sewing processes and prepared into an airbag cushion having a certain shape. The airbag shape is not specifically limited and it may be prepared into a common shape.

Meanwhile, according to yet another embodiment of the invention, an airbag system comprising the airbag is provided. The airbag system may be equipped with commonly known devices. The airbag is largely divided into a frontal airbag and a side curtain airbag. The frontal airbag may include those for driver's seat, passenger seat, side protection, knee protection, ankle protection, pedestrian protection, and the like, and the side curtain type airbag may protect passenger at side crash or overturn of an automobile. Therefore, the airbag of the present invention includes the frontal airbag and the side curtain airbag.

In the present invention, items besides above disclosure can be added or subtracted with necessity and the present invention does not limit them particularly.

Effects of the Invention

According to the present invention, polyester fiber for an airbag that has optimized initial Young's modulus, elongation, shrinkage, strength, and the like, and thus, may be prepared into fabric for an airbag having excellent mechanical properties, flexibility and foldability is provided.

Since the polyester fiber for an airbag has low Young's modulus, high strength and high elongation, excellent dimensional stability, mechanical properties, air cut-off effect may be achieved when it is applied for fabric for an airbag, and simultaneously, excellent foldability and flexibility may be achieved, thus remarkably improving packing when installed in an automobile, and minimizing impact to a passenger to safely protect a passenger.

Therefore, the polyester fiber and polyester fabric using the same according to the present invention may be very preferably used for preparation of an airbag, and the like.

Hereinafter, preferable examples and comparative examples are presented for understanding the present invention. However, the following examples are only for illustrating the present invention and the present invention is not limited to or by them.

Examples 1-5

PET polymer having a specific intrinsic viscosity and CEG content was melt-spun and cooled to prepare undrawn polyester fiber, and then, the undrawn yarn was heat treated while drawing at a specific draw ratio to manufacture polyester fiber. The intrinsic viscosity and CEG content of the PET polymer, and spinning speed, spinning tension, spinning temperature, draw ratio, and heat treatment temperature are as described in the following Table 1, and the other conditions are commonly used conditions for manufacturing polyester fiber.

TABLE 1

|  | Example 1 | Example 2 | Example 3 | Example 4 | Example 5 |
| --- | --- | --- | --- | --- | --- |
| PET content (mol %) | 100 | 100 | 100 | 100 | 100 |
| Intrinsic viscosity of PET chip (dl/g) | 1.25 | 1.33 | 1.40 | 1.50 | 1.60 |
| CEG of PET chip (meq/kg) | 30 | 27 | 24 | 23 | 22 |
| Spinning temperature (° C.) | 293 | 295 | 295 | 295 | 295 |
| Total draw ratio | 5.99 | 6.03 | 6.07 | 6.11 | 6.15 |
| Heat treatment temperature (° C.) | 235 | 239 | 243 | 240 | 244 |
| Relaxation rate (%) | 5.6 | 5.7 | 5.8 | 6.1 | 6.3 |

For the polyester fiber manufactured in Examples 1-5, properties at room temperature were measured as follows, and the results are summarized in the following Table 2.

1) Tensile Strength and Elongation at Break

The tensile strength and elongation at break of the polyester fiber were measured using universal testing machine (Instron) by ASTM D 2256. The gauge length was 250 mm, tensile speed was 300 mm/min, initial load was 0.05 g/d, and measurement was conducted using rubber faced grip.

In the strength-elongation curve according to the measured tensile strength and elongation, elongation value (%) corresponding to each tensile strength (1.0 g/d, 5.0 g/d, 8.8 g/d) was confirmed, and strength (g/d) and maximum elongation (%) of the yarn at maximum strength point were confirmed.

2) Dry Heat Shrinkage

It was measured at 180° C. under initial tension (30 g) for 2 minutes using Testrite MK-V (a product of U.K. Testrite Co.).

3) Young's Modulus

Young's modulus and strength-elongation were measured by ASTM D 885, each Young's modulus at 1% and 2% elongation, namely, at a point where 1% and 2% elongated was shown in the following Table 2.

4) Toughness of Yarn

Toughness (J/m$^3$) was calculated by the following Calculation Formula 1.

Toughness (work of rupture)=$\int_0^{strain} F \cdot dl$   [Calculation Formula 1]

In the Calculation Formula 1, F denotes the load applied when the length of the polyester fiber is increased by dl; and dl is the increment of the length of the polyester fiber.

5) Degree of Crystallization

The density ρ of polyester fiber was measured at 25° C. according to density gradient column method using n-heptane and carbon tetrachloride, and the degree of crystallization was calculated according to the following Calculation Formula 4.

$$X_c (\text{Crystallinity}) = \frac{\rho_c(\rho - \rho_a)}{\rho(\rho_c - \rho_a)}$$   [Calculation Formula 4]

wherein, $\rho$ is the density of the fiber, $\rho_c$ is the density of the crystal region ($\rho_c$=1.457 g/cm³ in the case of PET), and $\rho_a$ is the density of the amorphous region ($\rho_a$=1.336 g/cm³ in the case of PET).

6) Intrinsic Viscosity

Emulsion was extracted from the sample using carbon tetrachloride, and dissolved in OCP (Ortho Chloro Phenol) at 160±2° C., and then, the viscosity of the sample was measured in a viscosity tube using automatic viscometer (Skyvis-4000), and the intrinsic viscosity (IV) of the polyester fiber was calculated according to the following Calculation Formula 5.

Intrinsic viscosity (IV)={(0.0242×Rel)+0.2634}×F

Rel=(seconds of solution×specific gravity of solution×viscosity coefficient)/(OCP viscosity)

F=(IV of the standard chip)/(average of three IV measured from the standard chip with standard action)     [Calculation Formula 5]

7) CEG Content

The CEG content of polyester fiber was measured according to ASTM D 664 and D 4094. Specifically, 0.2 g of sample was introduced into a 50 mL Erlenmeyer flask, 20 mL of benzyl alcohol was added, the temperature was raised to 180° C. using a hot plate and maintained for 5 minutes to completely dissolve the sample, and cooled to 160° C., and 5-6 drops of phenolphthalein were added when the temperature reaches 135° C., the mixture was titrated with 0.02N KOH, and the CEG content (COOH million equiv./sample kg) was calculated by the following Calculation Formula 6 at a titration point where the color turns from colorless to pink.

CEG=(A−B)×20×1/W     [Calculation Formula 6]

In the Calculation Formula 6, A denotes the amount (mL) of KOH consumed for titration of the sample, B denotes the amount (mL) of KOH consumed for titration of blank sample, and W is the weight (g) of the sample.

8) Single Yarn Fineness 9,000 m yarn was taken using a reel, and weighed to obtain total fineness (Denier) of the yarn, which is divided by the number of filaments to calculate single yarn fineness.

TABLE 2

| | Example 1 | Example 2 | Example 3 | Example 4 | Example 5 |
|---|---|---|---|---|---|
| Degree of Crystallization (%) | 43.2 | 43.9 | 45.2 | 45.6 | 46.3 |
| Intrinsic viscosity of yarn (dl/g) | 0.92 | 0.96 | 0.98 | 1.01 | 1.04 |
| CEG of yarn (meq/kg) | 33 | 29 | 27 | 26 | 26 |
| Young's modulus of yarn (at 1% elongation, g/de) | 99 | 96 | 97 | 94 | 98 |
| Young's modulus of yarn (at 2% elongation, g/de) | 78 | 76 | 77 | 76 | 77 |
| Maximum tensile strength of yarn (g/d) | 9.1 | 9.15 | 9.20 | 9.3 | 9.33 |
| Elongation at break of yarn (%, at maximum tensile strength point) | 16.5 | 17 | 18.5 | 17.2 | 17.6 |
| Dry heat shrinkage of yarn (%) | 5.2 | 5.3 | 3.8 | 4.5 | 5.3 |
| Toughness of yarn (J/m³) | 96.5 | 97 | 99 | 103 | 106 |
| Single yarn fineness of yarn (DPF) | 3.82 | 3.23 | 2.92 | 4.61 | 4.17 |
| Total fineness of yarn (de) | 420 | 420 | 420 | 600 | 600 |
| Filament number of yarn | 110 | 130 | 144 | 130 | 144 |
| Elongation at 1.0 g/d (%) | 0.989 | 1.002 | 0.996 | 0.994 | 1.012 |
| Elongation at 5.0 g/d (%) | 7.325 | 7.333 | 7.376 | 7.345 | 7.356 |
| Elongation at 8.8 g/d (%) | 14.1 | 13.9 | 13.9 | 14.2 | 14.3 |
| Elongation increment from 8.8 g/d to maximum tensile strength (%) | 1.8 | 2.3 | 2.7 | 3.0 | 3.2 |

The properties of the polyester fiber prepared according to Examples 1-5 were measured by the above explained method after heat treatment at 185° C. for 2 minutes, and summarized in the following Table 3.

However, instead of confirming elongation (%) at tensile strength of 8.8 g/d in strength-elongation curve, elongation (%) at tensile strength 8.0 g/d was confirmed, and tensile strength measurement value (g/d) was confirmed at 20% elongation.

TABLE 3

| | Example 1 | Example 2 | Example 3 | Example 4 | Example 5 |
|---|---|---|---|---|---|
| Degree of Crystallization (%) | 42.2 | 42.9 | 43.8 | 44.2 | 45.0 |
| Intrinsic viscosity of yarn (dl/g) | 0.89 | 0.91 | 0.93 | 0.95 | 0.98 |
| CEG of yarn (meq/kg) | 43 | 40 | 37 | 33 | 31 |
| Young's modulus of yarn (at 1% elongation, g/de) | 69 | 68 | 66 | 64 | 62 |
| Young's modulus of yarn (at 2% elongation, g/de) | 49.8 | 48.8 | 46.8 | 44.3 | 43.2 |
| Maximum tensile strength of yarn (g/d) | 8.45 | 8.52 | 8.68 | 8.75 | 8.81 |
| Elongation at break of yarn (%, at maximum tensile strength point) | 22.5 | 22.8 | 23.2 | 23.6 | 24.8 |
| Toughness of yarn (J/m³) | 88 | 93 | 96 | 99 | 103 |
| Single yarn fineness of yarn (DPF) | 3.82 | 3.23 | 2.92 | 4.61 | 4.17 |
| Total fineness of yarn (de) | 420 | 420 | 420 | 600 | 600 |
| Filament number of yarn | 110 | 130 | 144 | 130 | 144 |
| Elongation at 1.0 g/d (%) | 1.87 | 1.86 | 1.90 | 1.88 | 1.91 |
| Elongation at 5.0 g/d (%) | 16.7 | 16.8 | 16.9 | 17.0 | 17.2 |
| Elongation at 8.8 g/d (%) | 21.6 | 21.8 | 21.8 | 22.0 | 22.3 |
| Elongation increment from 8.8 g/d to maximum tensile strength (%) | 0.9 | 1.0 | 1.4 | 1.6 | 2.5 |
| Tensile strength at 20% elongation (g/de) | 6.42 | 6.48 | 6.55 | 6.73 | 6.85 |

Comparative Examples 1-5

Polyester fiber of Comparative Examples 1-5 was manufactured by the same method as Examples 1-5, except the conditions described in the following Table 4.

TABLE 4

|  | Comparative Example 1 | Comparative Example 2 | Comparative Example 3 | Comparative Example 4 | Comparative Example 5 |
|---|---|---|---|---|---|
| PET content (mol %) | 100 | 100 | 100 | 100 | 100 |
| Intrinsic viscosity of PET chip (dl/g) | 0.85 | 0.90 | 0.95 | 0.90 | 0.95 |
| CEG of PET chip (meq/kg) | 50 | 47 | 43 | 47 | 43 |
| Spinning temperature (° C.) | 301 | 302 | 305 | 302 | 305 |
| Total draw ratio | 4.95 | 5.03 | 5.10 | 5.03 | 5.10 |
| Heat treatment temperature (° C.) | 220 | 223 | 227 | 223 | 227 |
| Relaxation rate (%) | 4.7 | 4.75 | 4.8 | 4.75 | 4.8 |

The properties of the polyester fiber manufactured according to Comparative Examples 1-5 were measured at room temperature without heat treatment by the same method as Examples 1-5, and summarized in the following Table 5.

TABLE 5

|  | Comparative Example 1 | Comparative Example 2 | Comparative Example 3 | Comparative Example 4 | Comparative Example 5 |
|---|---|---|---|---|---|
| Degree of Crystallization (%) | 41.7 | 41.9 | 41.9 | 41.9 | 41.9 |
| Intrinsic viscosity of yarn (dl/g) | 0.61 | 0.63 | 0.65 | 0.63 | 0.65 |
| CEG of yarn (meq/kg) | 57 | 53 | 50 | 53 | 50 |
| Young's modulus of yarn (at 1% elongation, g/de) | 115 | 119 | 125 | 119 | 125 |
| Young's modulus of yarn (at 2% elongation, g/de) | 90 | 93 | 93 | 92 | 92 |
| Maximum tensile strength of yarn (g/d) | 6.9 | 7.2 | 7.3 | 7.2 | 7.7 |
| Elongation at break of yarn (%, at maximum tensile strength point) | 10 | 11 | 13.0 | 13.8 | 14.2 |
| Dry heat shrinkage of yarn (%) | 15.5 | 13.6 | 11.4 | 12.0 | 11.8 |
| Toughness of yarn (J/m³) | 59 | 63 | 67 | 63 | 67 |
| Single yarn fineness of yarn (DPF) | 7.35 | 6.94 | 6.94 | 10.0 | 9.14 |
| Total fineness of yarn (de) | 500 | 500 | 500 | 680 | 680 |
| Filament number of yarn | 68 | 72 | 72 | 68 | 72 |
| Elongation at 1.0 g/d (%) | 0.850 | 0.865 | 0.870 | 0.880 | 0.920 |
| Elongation at 5.0 g/d (%) | 6.370 | 6.390 | 6.420 | 6.370 | 6.390 |
| Elongation at 8.8 g/d (%) | — | — | — | — | — |
| Elongation increment from 8.8 g/d to maximum tensile strength (%) | — | — | — | — | — |

The properties of the polyester fiber manufactured according to Comparative Examples 1-5 were measured after heat treatment at 185° C. for 2 minutes by the same method as Examples 1-5, and summarized in the following Table 6.

TABLE 6

|  | Comparative Example 1 | Comparative Example 2 | Comparative Example 3 | Comparative Example 4 | Comparative Example 5 |
|---|---|---|---|---|---|
| Degree of Crystallization (%) | 38.4 | 38.6 | 38.9 | 39.4 | 39.6 |
| Intrinsic viscosity of yarn (dl/g) | 0.59 | 0.57 | 0.58 | 0.61 | 0.60 |
| CEG of yarn (meq/kg) | 67 | 63 | 60 | 63 | 60 |
| Young's modulus of yarn (at 1% elongation, g/de) | 75 | 74 | 73 | 73 | 72 |
| Young's modulus of yarn (at 2% elongation, g/de) | 56 | 55 | 55 | 54 | 53 |
| Maximum tensile strength of yarn (g/d) | 4.9 | 5.0 | 5.1 | 5.2 | 5.3 |
| Elongation at break of yarn (%, at maximum tensile strength point) | 23.5 | 23.5 | 24.6 | 24.8 | 25.6 |
| Toughness of yarn (Toughness, J/m³) | 57 | 59 | 60 | 61 | 64 |
| Single yarn fineness of yarn (DPF) | 7.35 | 6.94 | 6.94 | 10.0 | 9.14 |
| Total fineness of yarn (de) | 500 | 500 | 500 | 680 | 680 |
| Filament number of yarn | 68 | 72 | 72 | 68 | 72 |
| Elongation at 1.0 g/d (%) | 1.94 | 1.96 | 1.98 | 2.02 | 2.05 |
| Elongation at 5.0 g/d (%) | 10.8 | 11.0 | 11.0 | 11.3 | 11.5 |
| Elongation at 8.8 g/d (%) | — | — | — | — | — |
| Elongation increment from 8.8 g/d to maximum tensile strength (%) | — | — | — | — | — |
| Tensile strength at 20% elongation (g/de) | 3.15 | 3.17 | 3.23 | 3.30 | 3.56 |

Figure 3:
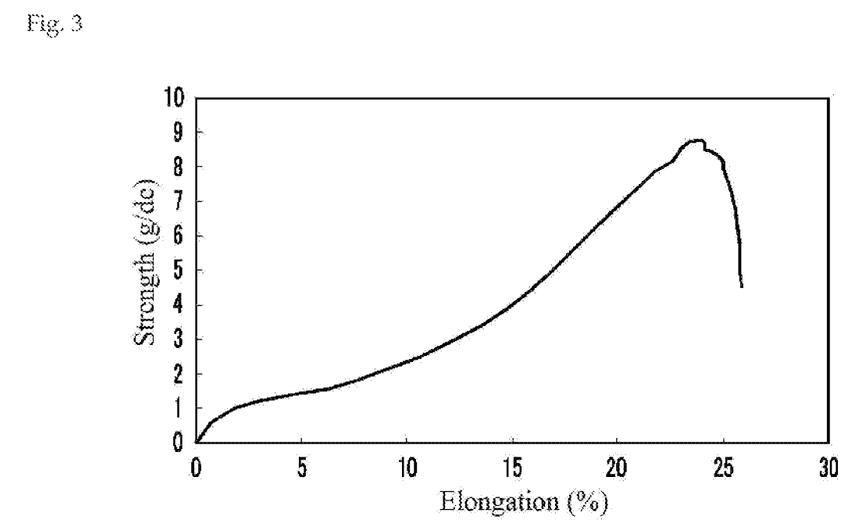
FIG. 3 shows strength-elongation curve of the polyester fiber according to Example 5, measured after heat treatment at 185° C. for 2 minutes.
Figure 4:
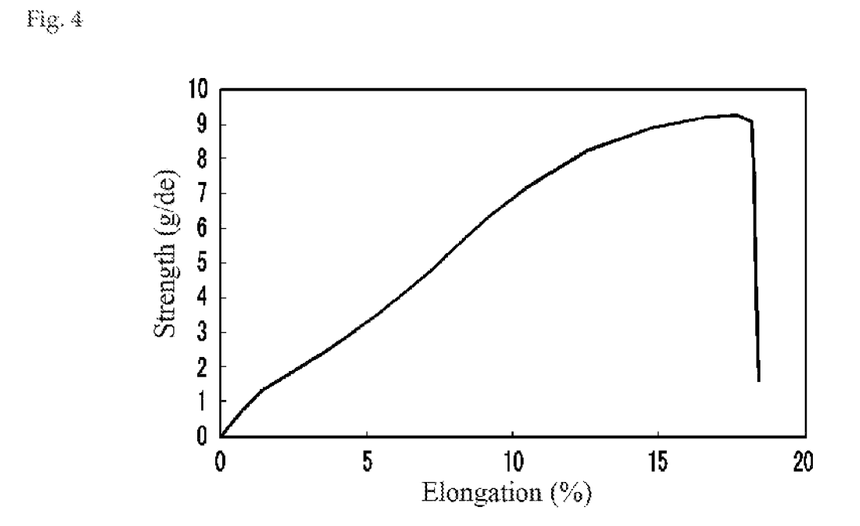
FIG. 4 shows strength-elongation curve of the polyester fiber according to Example 5, measured at room temperature.

The strength-elongation curves of the polyester fiber according to Example 5, measured at room temperature and after heat treatment at 185° C. for 2 minutes were respectively shown in FIG. 3 and FIG. 4. The strength-elongation curves of the polyester fiber according to Comparative Example 5, measured at room temperature and after heat treatment at 185° C. for 2 minutes were respectively shown in FIG. 5 and FIG. 6.

As shown in FIG. 3 and FIG. 4, although the fiber for an airbag according to Example 5 exhibits slight lowering of tensile strength after heat treatment at 185° C. for 2 minutes compared to room temperature, excellent tensile strength range is maintained as 8.81 g/d, and elongation is remarkably improved due to rearrangement of molecular orientation of PET polymer, and thus, toughness of the final yarn is not significantly lowered compared to room temperature. Therefore, the polyester fiber according to Example 5 has excellent properties of high strength, high elongation and low Young's modulus, thereby achieving excellent mechanical properties and air-cut off effect when applied for fabric for an automobile airbag.

Figure 5:
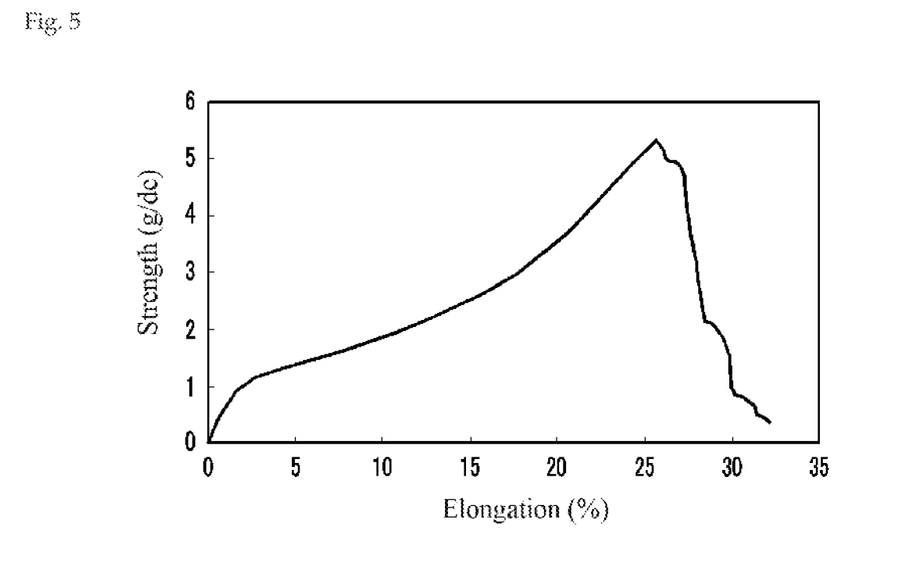
FIG. 5 shows strength-elongation curve of the polyester fiber according to Comparative Example 5, measured after heat treatment at 185° C. for 2 minutes.
Figure 6:
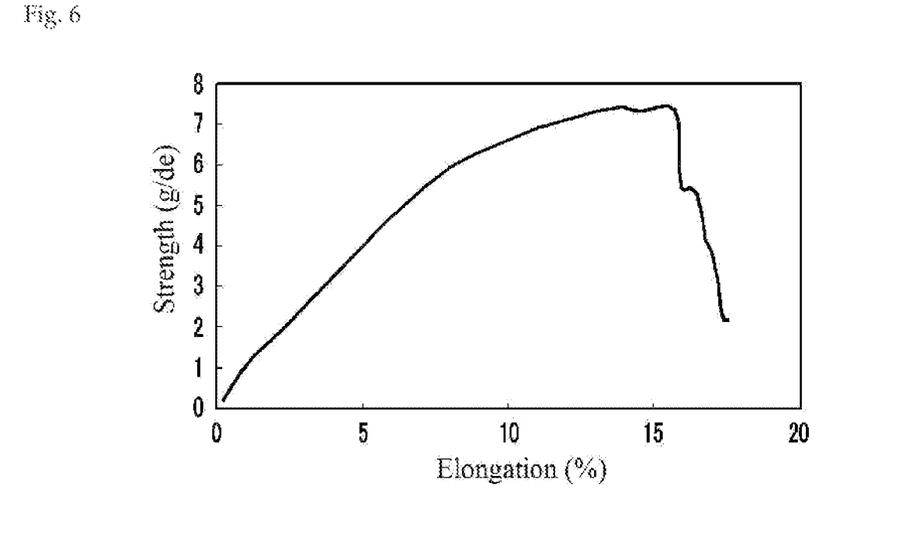
FIG. 6 shows strength-elongation curve of the polyester fiber according to Comparative Example 5, measured at room temperature.

To the contrary, as shown in FIG. 5 and FIG. 6, the fiber for an airbag according to Comparative Example 5 exhibits largely lowered tensile strength after heat treatment at 185° C. for 2 minutes, and the tensile strength becomes about 5.3 g/d, which is not suitable for application for fabric for an airbag. As such, since the polyester fiber according to Comparative Example 5 exhibits low toughness and high initial Young's modulus, when applied for fabric for an airbag, strength is remarkably lowered, a capacity of absorbing high temperature-high pressure inflator gas energy is lowered, and packaging performance of the airbag cushion is deteriorated, and thus, it is not suitable for use as fabric for an airbag.

Preparation Examples 1-5

Raw fabrics for an airbag were woven through Rapier Loom using the polyester fiber prepared according to Examples 1-5, fabrics for an airbag were prepared through scouring and heat setting processes, and liquid silicone rubber (LSR) resin was coated on the fabric by knife over roll coating to prepare silicon-coated fabric.

The warp and weft weave density, weave form, and resin coating amount of the fabrics are as shown in the following Table 7, and the other conditions are commonly used conditions for preparing polyester fabric for an airbag.

TABLE 7

|  | Preparation Example 1 | Preparation Example 2 | Preparation Example 3 | Preparation Example 4 | Preparation Example 5 |
|---|---|---|---|---|---|
| Weave density (warp × weft) | 49 × 49 | 49 × 49 | 49 × 49 | 43 × 43 | 43 × 43 |
| Weave form | Plain weave | Plain weave | Plain weave | Plain weave | Plain weave |
| Heat treatment/ vulcanization temperature(° C.) | 180 | 185 | 190 | 185 | 190 |
| Rubber ingredient | Liquid silicone | Liquid silicone | Liquid silicone | Liquid silicone | Liquid silicone |
| Resin coating amount (g/m²) | 25 | 25 | 25 | 25 | 25 |

The properties of each polyester fabric for an airbag prepared using the polyester fiber prepared according to Examples 1-5 were measured, and summarized in the following Table 8.

(a) Toughness of Fabric

The toughness (J/m³) of fabric was calculated by the following Calculation Formula 2.

Toughness (work of rupture)=$\int_0^{strain} F \cdot dl$ [Calculation Formula 2]

In the Calculation Formula 2, F denotes the load applied when the length of the polyester fabric is increased by dl; and dl is the increment of the length of the polyester fabric. Here, the toughness of fabric was measured for non-coated fabric before coating.

(b) Tear Strength

The tear strength of the non-coated fabric was measured according to ASTM D 2261 TONGUE.

First, the non-coated fabric was cut out to a specimen of 75 mm×200 mm. The top and bottom of the specimen were respectively located between the left right space of the jaw face of the upper and lower end in the apparatus according to ASSTM D 2261 TONGUE. And then, while moving at a speed of 300 mm/min to each opposite direction, namely to the upper direction for the upper apparatus and to the lower direction for the lower apparatus, with an interval of the jaw face of 76 mm, strength was measured when the fabric was torn.

(c) Tensile Strength and Elongation at Break

The non-coated fabric was cut out to a specimen, fixed in the lower clamp of tensile strength measuring device according to ASTM D 5034, and while moving the upper clamp to the upper direction, strength and elongation were measured when the fabric specimen for an airbag was broken.

(d) Edge Comb Resistance

The edge comb resistance of the fabric was measured at room temperature (25° C.) and 90° C. according to ASTM D 6479 using the non-coated fabric before coating.

(e) Cover Factor (CF)

The cover factor value of the non-coated fabric was calculated by the following Calculation Formula 3.

Cover factor (CF)=warp density (thread/inch)× $\sqrt{warpdenier}$+weft density (thread/inch)× $\sqrt{weftdenier}$ [Calculation Formula 3]

(f) Fabric Shrinkage in the Warp and Weft Directions

Fabric shrinkage in the warp/weft directions were measured according to ASTM 3 1776. First, the non-coated fabric was cut out to a specimen, each 20 cm length was marked before shrinkage in warp and weft directions, and shrunken length of the specimen heat treated in a chamber at 149° C. for 1 hour was measured to measure fabric shrinkage in warp and weft directions {(length before shrinkage−length after shrinkage)/length before shrinkage× 100%}.

(g) Stiffness

The stiffness of the non-coated fabric was measured by a Circular Bend method using a stiffness measuring apparatus according to ASTM D 4032. Also, a canti-lever method may be applied as a stiffness measuring method, wherein stiffness may be measured through measurement of a fabric bending length using a canti-lever measuring apparatus, which is a test board inclined at a certain angle so as to provide bending to fabric.

(h) Thickness

The thickness of the non-coated fabric was measured according to ASTM D 1777.

(i) Air Permeability

According to ASTM D 737, the non-coated fabric was allowed to stand at 20° C., 65% RH for one or more days, and then, the amount of air respectively with ΔP of 125 pa and 500 pa passing through a circular cross section of 38 cm² was measured to present as static air permeability.

Also, according to ASTM D 6476, the dynamic air permeability of the non-coated fabric was measured using TEXTEST FX 3350 Dynamic Air Permeability Tester.

TABLE 8

|  | Preparation Example 1 | Preparation Example 2 | Preparation Example 3 | Preparation Example 4 | Preparation Example 5 |
|---|---|---|---|---|---|
| Toughness of fabric (kJ/m³) | 3.75 | 3.83 | 3.92 | 5.4 | 5.6 |
| Tear strength of fabric(kgf)/non-coated | 19 | 19 | 20 | 26 | 26 |

TABLE 8-continued

|  | Preparation Example 1 | Preparation Example 2 | Preparation Example 3 | Preparation Example 4 | Preparation Example 5 |
|---|---|---|---|---|---|
| Tear strength of fabric(kgf)/coated | 36 | 37 | 38 | 38 | 40 |
| Tensile strength of fabric (kgf/inch) | 227 | 230 | 234 | 297 | 305 |
| Elongation at break of fabric (%) | 37 | 37 | 39 | 38 | 40 |
| Edge comb resistance of fabric (25° C.) | 430 | 446 | 450 | 520 | 535 |
| Edge comb resistance of fabric (90° C.) | 380 | 390 | 415 | 480 | 495 |
| Cover factor of fabric | 2,008 | 2,008 | 2,008 | 2,107 | 2,107 |
| Fabric shrinkage (%) Warp | 0.5 | 0.5 | 0.4 | 0.4 | 0.5 |
| Weft | 0.3 | 0.3 | 0.4 | 0.3 | 0.3 |
| Stiffness (kgf) | 0.40 | 0.40 | 0.35 | 1.00 | 0.90 |
| Thickness (mm) | 294 | 294 | 295 | 338 | 338 |
| Static air permeability (cfm) $\Delta P = 125$ pa | 1.0 | 0.9 | 0.8 | 0.6 | 0.6 |
| $\Delta P = 500$ pa | 9.5 | 9.3 | 9.2 | 5.4 | 5.4 |
| Dynamic air permeability (mm/s) | 620 | 610 | 590 | 450 | 430 |

Comparative Preparation Examples 1-5

Polyester fabrics for an airbag of Comparative Preparation Examples 1-5 were measured by the same method as Preparation Examples 1-5, except using the polyester fiber of Comparative Examples 1-5 instead of the polyester fiber prepared according to Examples 1-5, and the properties were measured and summarized in the following Table 9.

TABLE 9

|  | Comparative Preparation Example 1 | Comparative Preparation Example 2 | Comparative Preparation Example 3 | Comparative Preparation Example 4 | Comparative Preparation Example 5 |
|---|---|---|---|---|---|
| Toughness of fabric (kJ/m³) | 2.5 | 2.7 | 2.9 | 2.7 | 2.9 |
| Tear strength of fabric(kgf)/non-coated | 13 | 14 | 15 | 19 | 20 |
| Tear strength of fabric(kgf)/coated | 21 | 23 | 23 | 23 | 24 |
| Tensile strength of fabric (kgf/inch) | 183 | 182 | 185 | 195 | 198 |
| Elongation at break of fabric (%) | 20 | 21 | 22 | 20 | 22 |
| Edge comb resistance of fabric (25° C.) | 270 | 280 | 285 | 320 | 327 |
| Edge comb resistance of fabric (90° C.) | 255 | 263 | 269 | 295 | 298 |
| Cover factor of fabric | 2,192 | 2,192 | 2,192 | 2,243 | 2,243 |
| Fabric shrinkage (%) Warp | 1.3 | 1.3 | 1.2 | 1.2 | 1.1 |
| Weft | 1.2 | 1.0 | 0.9 | 1.0 | 0.9 |
| Stiffness (kgf) | 2.1 | 1.9 | 1.8 | 2.3 | 2.3 |
| Thickness (mm) | 303 | 305 | 305 | 350 | 350 |
| Static air permeability (cfm) $\Delta P = 125$ pa | 2.4 | 2.3 | 2.2 | 2.2 | 2.1 |
| $\Delta P = 500$ pa | 13.5 | 13.3 | 13.0 | 12.6 | 12.5 |
| Dynamic air permeability (mm/s) | 1,900 | 1,850 | 1,800 | 1,950 | 1,850 |

As shown in the Table 8, the fabrics for an airbag of Preparation Examples 1-5 using the polyester fiber of Examples 1-5 having optimized tensile strength and elongation ranges and low initial Young's modulus as measured after heat treatment exhibited toughness of 3.75 to 5.6 kJ/m³, tear strength of the non-coated fabric of 19 to 26 kgf, tensile strength of 227 to 305 kgf/inch, and fabric shrinkage of 0.4% to 0.5% and 0.3 to 0.4% respectively in warp and weft directions, thus having very excellent properties. At the same time, it is confirmed that the polyester fabrics for an airbag of Preparation Examples 1-5 have optimum stiffness range of 0.35 to 1.0 kgf, thus having excellent dimensional stability, mechanical properties, foldability, and packing.

Particularly, since the fabrics for an airbag of Preparation Examples 1-5 use high strength high elongation low Young's modulus yarn, the non-coated fabric exhibits static air permeability ($\Delta P$=125 pa) of 0.6 to 1.0 cfm, and static air permeability ($\Delta P$=500 pa) of 5.4 to 9.5 cfm, thus achieving excellent air tightness. Although the fabric exhibits lower cover factor value compared to Comparative Preparation Examples 1-5, it exhibits very excellent edge comb resistance values respectively at 25° C. and 90° C. of 430-535 N and 380-495 N, thereby largely improving burst at cushion seam parts when the airbag cushion is deployed.

To the contrary, as shown in the Table 9, the fabrics for an airbag of Comparative Preparation Examples 1-5 by using the polyester fiber of Comparative Examples 1-5 exhibit shrinkage in warp and weft directions of 0.9% to 1.3%, tensile strength of 182 to 198 kgf/inch, and tear strength of the non-coated fabric of 13 to 20 kgf. As such, in case the fabric with remarkably lowered mechanical properties including tensile strength and tear strength, and the like is used for an airbag apparatus, problems such as burst of the airbag when the airbag is deployed may be caused due to lowering of mechanical properties.

The non-coated fabrics according to Comparative Preparation Examples 1-5 exhibit largely increased static air permeability (ΔP=125 pa) of 2.1 to 2.4 cfm, and static air permeability (ΔP=500 pa) of 12.5 to 13.5 cfm, and thus, it can be seen that air tightness is lowered. As such, if the air permeability is increased, air may easily get out when the airbag is deployed, and the function as an airbag may not be sufficiently manifested. Although the cover factor value of the fabric is high compared to Preparation Examples 1-5, edge comb resistances at 25° C. and 90° C. are remarkably lowered as 270-327 N and 255-298 N, respectively, and thus, burst at cushion seam parts may be significantly generated when the airbag cushion is deployed, which may be a serious problem in terms of safety of a passenger.

Experimental Example 1

Airbag cushions were manufactured using the polyester non-coated fabrics for an airbag of Preparation Examples 1-5 and Comparative Preparation Examples 1-5, and airbags for an automobile were manufactured as DAB (driver airbag) cushion assembly or PAB (passenger airbag) cushion assembly as shown in the following Table 10.

For the manufactured airbags for an automobile, static tests were conducted under three heat treatment conditions (at room temperature: 25° C.×4 hr standing in oven, Hot: 85° C.×4 hr standing in oven, Cold: −30° C.×4 hr standing in oven). As the results of the static test, in case there is no fabric tearing, pin hole generation and fabric carbonization, it is judged as "Pass", and in case one of fabric tearing, pin hole generation, or fabric carbonization occurs, it is judged as "Fail".

The results of the static tests of the airbag cushions manufactured by using the polyester non-coated fabrics of Preparation Examples 1-5 and Comparative Preparation Examples 1-5 are shown in the following Table 10.

TABLE 10

| Cushion specifications | | Powder inflator pressure (kPa) | Room temperature static test | Hot Static test | Cold Static test |
|---|---|---|---|---|---|
| Preparation Example 1 | DAB | 190 | Pass | Pass | Pass |
| Preparation Example 2 | DAB | 190 | Pass | Pass | Pass |
| Preparation Example 3 | DAB | 190 | Pass | Pass | Pass |
| Preparation Example 4 | PAB | 330 | Pass | Pass | Pass |
| Preparation Example 5 | PAB | 330 | Pass | Pass | Pass |
| Comparative Preparation Example 1 | DAB | 190 | Fail | Fail | Fail |
| Comparative Preparation Example 2 | DAB | 190 | Fail | Fail | Fail |
| Comparative Preparation Example 3 | DAB | 190 | Fail | Fail | Fail |
| Comparative Preparation Example 4 | PAB | 330 | Fail | Fail | Fail |
| Comparative Preparation Example 5 | PAB | 330 | Fail | Fail | Fail |

As shown in the Table 10, as the results of progressing static tests for the airbags for an automobile comprising the fabrics for an airbag of Preparation Examples 1-5 using the polyester fiber of Examples 1-5 having optimized tensile strength and elongation ranges and low initial Young's modulus as measured after heat treatment, under 3 heat treatment conditions, fabric tearing, pin hole generation, and fabric carbonization, and the like did not occur, and thus, it can be seen that all the cushions have excellent performance as an airbag for an automobile.

To the contrary, as the results of static tests of the airbags for an automobile comprising the fabrics for an airbag of Comparative Preparation Examples 1-5 using the polyester fiber of Comparative Examples 1-5, due to fabric tearing, pin hole generation, and fabric carbonization, and the like when the airbag is deployed, all the cushions are judged as "Fail", and thus, they cannot be practically used as an airbag. Particularly, in the static test of the DAB (driver airbag) cushion assembly comprising the fabrics of Comparative Preparation Examples 1, 2, 3, fabric tearing occurred at the outer seam part of the cushions. In the case of Comparative Preparation Example 4, fabric tearing occurred at the inlet of the inflator. In the case of Comparative Preparation Example 5, fabric tearing occurred at the main panel seam part. Also, in the static tests of the airbags for an automobile comprising the fabrics of Comparative Preparation Examples 1-5, fabric tearing resulted from and thus occurred together with pinhole generation at sewing parts and fabric carbonization. Thus, if the fabrics for an airbag of Comparative Preparation Examples 1-5 are practically applied for an airbag cushion for an automobile, serious danger may be caused in the function of the airbag due to burst of the airbag, and the like.

What is claimed:

1. A polyester fiber having elongation of 1.65% to 2.5% when tensile strength of 1.0 g/d is applied after a heat treatment at 185° C. for 2 minutes, which additionally elongates in the range of elongation from 0.5% to 5% at the range of tensile strength from 8.0 g/d to a maximum tensile strength, wherein a maximum tensile strength and a maximum elongation of the polyester fiber at a breaking point are 9.2 g/d to 11.0 g/d and 17.2% to 30%, respectively, which are measured at a room temperature before the heat treatment at 185° C. for 2 minutes;

wherein a toughness of the polyester fiber is 99 J/m$^3$ to 120 J/m$^3$, which is measured at the room temperature before the heat treatment at 185° C. for 2 minutes, as defined by the following Calculation Formula 1:

$$\text{toughness (work of rupture)} = \int_0^{strain} F \cdot dl \quad \text{[Calculation Formula 1]}$$

wherein, F denotes a load applied when a length of the polyester fiber is increased by dl and dl is an increment of the length of the polyester fiber; and wherein the polyester fiber is prepared by a process comprising:

melt spinning a polyester polymer having an intrinsic viscosity of 1.4 dl/g or more at 270 to 320° C. to prepare an undrawn polyester yarn, and drawing the undrawn polyester yarn.

2. The polyester fiber according to claim 1, wherein the polyester fiber has elongation of 16% to 22% when tensile strength of 5.0 g/d is applied after heat treatment at 185° C. for 2 minutes.

3. The polyester fiber according to claim 1, wherein the polyester fiber has elongation of 0.8% to 2.0% when tensile strength of 1.0 g/d is applied at room temperature, and additionally elongates in the range of elongation from 1.5% to 5% at the range of tensile strength from 8.8 g/d to the maximum strength.

4. The polyester fiber according to claim 1, wherein the polyester fiber has elongation of 6.5% to 13.5% when tensile strength of 5.0 g/d is applied at room temperature.

5. The polyester fiber according to claim 1, wherein the polyester fiber has tensile strength of 4.5 g/d or more at elongation of 20% after heat treatment at 185° C. for 2 minutes.

6. The polyester fiber according to claim 1, wherein the elongation of the fiber measured after heat treatment at 185° C. for 2 minutes is 105% or more based on the elongation of the yarn measured at room temperature.

7. The polyester fiber according to claim 1, wherein the tensile strength of the fiber measured after heat treatment at 185° C. for 2 minutes is 90% or more based on the tensile strength of the yarn measured at room temperature.

8. The polyester fiber according to claim 1, wherein the polyester fiber has Young's modulus of 55 to 70 g/d at elongation of 1%, and 35 to 52 g/d at elongation of 2%, as measured by ASTM D 885 after the heat treatment at 185° C. for 2 minutes.

9. The polyester fiber according to claim 1, wherein the polyester fiber has total fineness of 400 to 650 deniers.

10. The polyester fiber according to claim 1, wherein the polyester fiber has single yarn fineness of 2.5 to 6.8 deniers per filament, and includes 96 to 160 strands of filaments.

11. The polyester fiber according to claim 1, wherein the polyester fiber has degree of crystallization of 40% to 55%.

12. A method for preparing the polyester fiber according to claim 1, including the steps of:
melt spinning polyester polymer having intrinsic viscosity of 1.4 dl/g or more at 270 to 320° C. to prepare undrawn polyester yarn, and
drawing the undrawn polyester yarn.

13. The method according to claim 12, wherein the intrinsic viscosity difference between the polyester polymer and polyester fiber is 0.7 dl/g or less.

14. The method according to claim 12, wherein the drawing process is carried out with a total draw ratio of 5.0 to 6.5.

15. The method according to claim 12, further including a heat setting process for heat treating the yarn at 170 to 250° C., after drawing the undrawn yarn.

16. The method according to claim 12, further including the step of relaxing the yarn with the relaxation ratio of 14% or less, after drawing the undrawn yarn.

17. A polyester fabric comprising the polyester fiber according to claim 1.

18. The polyester fabric according to claim 17, wherein the polyester fabric has stiffness of 1.5 kgf or less, as measured according to ASTM D 4032.

19. The polyester fabric according to claim 17, wherein the polyester fabric has static air permeability of 10.0 cfm or less when ΔP is 125 Pa, and 14 cfm or less when ΔP is 500 Pa, as measured according to ASTM D 737.

20. The polyester fabric according to claim 17, wherein the polyester fabric has dynamic air permeability of 1,700 mm/s or less, as measured according to ASTM D 6476.

21. The polyester fabric according to claim 17, wherein the polyester fabric has edge comb resistance of 350 N or more at room temperature, and 300 N or more at 90° C., as measured according to ASTM D 6479.

* * * * *